(12) United States Patent
Gordienko

(10) Patent No.: US 8,398,954 B2
(45) Date of Patent: Mar. 19, 2013

(54) PROCESS FOR THE PRODUCTION OF TITANIUM DIOXIDE

(75) Inventor: Pavel S. Gordienko, Valdivostok (RU)

(73) Assignee: Breton Spa, Treviso (IT)

( * ) Notice: Subject to any disclaimer, the term of this patent is extended or adjusted under 35 U.S.C. 154(b) by 581 days.

(21) Appl. No.: 11/852,431

(22) Filed: Sep. 10, 2007

(65) Prior Publication Data

US 2008/0044345 A1 Feb. 21, 2008

Related U.S. Application Data

(63) Continuation of application No. 10/593,243, filed as application No. PCT/EP2005/003050 on Mar. 22, 2005.

(30) Foreign Application Priority Data

Mar. 24, 2004 (RU) .............................. 2004108580

(51) Int. Cl.
*C01G 23/047* (2006.01)
(52) U.S. Cl. .......... 423/610; 423/611; 423/612; 423/85; 423/81; 423/413
(58) Field of Classification Search .................. 423/69; 106/436
See application file for complete search history.

(56) References Cited

U.S. PATENT DOCUMENTS

| | | | |
|---|---|---|---|
| 1,501,587 A | 7/1924 | Doremus | |
| 2,005,710 A * | 6/1935 | Daudt et al. | 570/167 |
| 2,042,435 A | 5/1936 | Svendsen | |
| 2,288,727 A * | 7/1942 | Mayer | 423/81 |
| 3,640,744 A * | 2/1972 | Dietz et al. | 106/438 |
| 4,107,264 A | 8/1978 | Nagasubramanian et al. | |
| 4,652,438 A * | 3/1987 | Folweiler | 423/489 |
| 4,803,056 A * | 2/1989 | Morris et al. | 422/156 |

FOREIGN PATENT DOCUMENTS

| | | |
|---|---|---|
| GB | 2 185 248 | 7/1987 |
| JP | 57183325 | * 11/1982 |

* cited by examiner

*Primary Examiner* — Basia Ridley
*Assistant Examiner* — Heng Chan
(74) *Attorney, Agent, or Firm* — Katten Muchin Rosenman LLP

(57) ABSTRACT

It is disclosed a process for the production of titanium dioxide comprising the following steps:
(a) a titanium ore containing iron, preferably ilmenite, is reacted with an aqueous $NH_4F$ solution;
(b) the aqueous suspension thus obtained is filtered with consequent separation of a sludge fraction, which contains ammonium fluoroferrates, and a filtrate fraction, which contains ammonium fluorotitanates;
(c) the filtrate fraction thus obtained is subjected to an hydrolysis reaction;
(d) the thus-obtained solid component is subjected to a thermal hydrolysis reaction.

The plant and the reactors for performing the above process are also disclosed.

17 Claims, 5 Drawing Sheets

PROCESS FOR THE PRODUCTION OF TITANIUM DIOXIDE

CROSS REFERENCE TO RELATED APPLICATION

This application is a continuation of U.S. application Ser. No. 10/593,243 filed Sep. 19, 2006, which is a National Stage of International Application No. PCT/EP2005/003050 filed Mar. 22, 2005, now International Publication WO 2005/090235, and claims priority to Russian Application No. 2004108580 filed Mar. 24, 2004, the contents of which are herein incorporated by reference.

The present invention relates to chemical reactors and may be used in processes of fluoride processing of titaniferous stock materials, for example, ilmenite concentrates, in the production of titanium dioxide.

Known in the art is a reactor facility made as a cascade of reactors and apparatus, comprising a heat exchanger, a pipeline system and control valves (see the book by S. M. Korsakov-Bogatkov "Chemical Reactors as Objects of Mathematical Simulation", Moscow: "Khimiya", 1967, pp. 64-69, Fig. III-18).

A disadvantage of these solutions is that they cannot be used effectively for realizing the fluoride technology of processing titaniferous stock materials, for example, ilmenite concentrates, in the production of titanium dioxide, because of insufficient endurance of the equipment.

Also known is a reactor facility comprising a reactor communicated with sources of reagents, which reactor is communicated through an unloading unit with apparatus for subsequent processing of reaction products, wherein the reactor, apparatus and parts of the facility are made of a material resistant to the effect of reactive materials contacting said reactor, apparatus and parts (see the book by S. M. Korsakov-Bogatkov "Chemical Reactors as Objects of Mathematical Simulation", Moscow, "Khimiya", 1967, pp. 64-69, Fig. III19).

However, this technical solution cannot be effectively used either for realizing the fluoride technology of processing titaniferous stock materials, for example, ilmenite concentrates, in the production of titanium dioxide, because of insufficient endurance of the equipment. Solving the problem of providing chemical resistance of the facility is complicated not only by the aggressiveness of the working medium, but also by the thermal regime of operation (in the order of 800-900° C.) required for obtaining quality product (titanium dioxide having a high degree of whiteness).

The problem to solving which the proposed technical solution is directed is to provide a possibility for using a reactor plant for realizing the fluoride technology of processing titaniferous stock materials to produce white and red pigments.

The technical result obtainable upon solving the posed problem is expressed in higher reliability and operability of the reactor facility under the conditions of highly aggressive fluoride-containing materials being employed in processing titaniferous stock materials, to produce white and red pigments. Furthermore, a high completeness of utilization of the stock materials along with a high yield and whiteness of the product are ensured.

Furthermore, as compared with the "chlorine" technology of processing, the technological process is simplified (the necessity in the steps of metallurgical processing, producing chlorine, and other power-demanding operations is obviated); while, as compared with the "sulfate" technology of processing, an appreciably higher quality of the product and the absence of wastes are ensured (the amount of wastes in the "sulfate" technology exceeding essentially the yield of the finished product: the production of 1 ton of titanium dioxide involves 3 tons of iron sulfide and 4 cubic meters of hydrolytic sulfuric acid which is very difficult to regenerate).

The posed problem is solved by that a reactor facility comprising a reactor communicated with sources of reagents, which reactor is communicated through an unloading unit with apparatus for subsequent processing of reaction products, wherein the reactor, apparatus and parts of the facility are made of a material resistant to the effect of reactive materials contacting said reactor, apparatus and parts is characterized in that as the sources of reagents use is made of a bin for a solid titaniferous material, for example, ilmenite, and a source of ammonium fluoride; the unloading unit comprises filtrate, sludge and gas outlets, the gas outlet of the reactor being communicated with a feeder of ammonia, the filtrate outlet of the reactor is communicated with a first filter whose filtrate outlet is communicated with a second filter whose filtrate outlet is communicated with the interior of a hydrolysis reactor whose outlet in its turn is communicated with a third filter whose sludge outlet is communicated with a first dispersing dryer whose sludge outlet is communicated with a loading unit of a first thermal hydrolysis reactor whose outlet is communicated with a container for storing white pigment, wherein the gas outlets of a second filter of the first dispersing dryer, of the third filter and of the first thermal hydrolysis reactor are communicated with the source of ammonium fluoride; furthermore, the feeder of ammonia is communicated with the second filter and with the interior of the hydrolysis reactor, the source of ammonium fluoride being additionally communicated with the interior of the hydrolysis reactor; furthermore, the sludge outlets of the reactor and of the first filter are communicated with a second dispersing dryer whose sludge outlet is communicated with the interior of a second thermal hydrolysis reactor whose outlet is communicated with a container for storing red pigment, the gas outlets of the second dispersing dryer and of the second thermal hydrolysis reactor being communicated with the source of ammonium fluoride; furthermore, the interior of the first thermal hydrolysis reactor and the interior of the second thermal hydrolysis reactor are communicated with a source of steam via steam pipes. Furthermore, the source of ammonium fluoride comprises a storage for ammonium fluoride, communicated with the feeder of ammonium fluoride via an evaporator whose vapor outlet is communicated via a condenser with a container for storing ammonia water, as the outlets of the source of ammonium fluoride use being made of the outlets of the feeder of ammonium fluoride, and as the inlets of the source of ammonium fluoride use being made of the inlets of the storage for ammonium fluoride. Furthermore, the feeder of ammonium fluoride is communicated via a heater with a feeder of ammonium. Furthermore, the sludge outlet of the second tilter is communicated with the inlet of the first filter. Furthermore, the interior of the hydrolysis reactor is communicated with a source of modifying agents.

A comparative analysis of the features of the claimed solution with the features of the prototype and of the analogs testifies to the conformity of the claimed solution with the criterion of "novelty".

The features of the distinctive clause of the set of claims provide solution of the following functional problems:

The features "as the sources of reagents use is made of a bin for a solid titaniferous material, for example, ilmenite, and a source of ammonium fluoride" provide realization of a first step of the technology of fluoride processing of titaniferous stock materials: "stripping" the starting product (its conversion into a physicochemical state providing the feasibility of the subsequent processing step).

The features "the unloading unit comprises filtrate, sludge and gas outlets" provide switching over (transferring) the reaction products to corresponding "technological chains", the latter unit (together with the feature "the gas outlet of the reactor being communicated with a feeder of ammonia") ruling out losses of ammonia (which is a waste in the first step of processing, but at the same time is one of the reagents used in the subsequent steps).

The features "the filtrate outlet of the reactor is communicated with a first filter whose filtrate outlet is communicated with a second filter whose filtrate outlet is communicated with the interior of a hydrolysis reactor" describe "a line for fine purification of the filtrate" of the technological chain of obtaining white pigment from iron compounds, i.e., provide removal of those admixtures whose presence in the finished product would not allow obtaining a high degree of whiteness of the pigment.

The features indicating that the outlet of the hydrolysis reactor is communicated with a third filter whose sludge outlet is communicated with a first dispersing dryer whose sludge outlet is communicated with a loading unit of a first thermal hydrolysis reactor" describe "a unit for dehydrating" ammonium oxofluorotitanate in the technological chain of obtaining white pigment, which provides preparing thereof to thermal hydrolysis.

The presence of a first thermal hydrolysis reactor provides (together with the feature regulating coupling the reactor interior to the source of steam) the possibility of processing ammonium oxofluorotitanate into white pigment and transferring it to the container for storing white pigment.

The features "the gas outlets of a second filter of the first dispersing dryer, of the third filter and of the first thermal hydrolysis reactor are communicated with the source of ammonium fluoride" provide reiterated use of this reagent, reducing its consumption, and thereby improve the technical and economic characteristics of the process for producing white pigment.

The features "the feeder of ammonia is communicated with the second filter and with the interior of the hydrolysis reactor" provide precipitating iron-containing components from solution of ammonium oxofluorotitanate and thereby its complete separation upon filtering.

The features "the source of ammonium fluoride being additionally communicated with the interior of the hydrolysis reactor" provide hydrolysis of ammonium hexafluorotitanate.

The features "the sludge outlets of the reactor and of the first filter are communicated with a second dispersing dryer whose sludge outlet is communicated with the interior of a second thermal hydrolysis reactor whose outlet is communicated with a container for storing red pigment" make it possible to prepare material to the thermal hydrolysis of ammonium hexafluoroferrate in the technological chain of producing red pigment and to carry out the process of thermal hydrolysis (upon steam supply), thereby ensuring complete utilization of the stock material owing to broadening the range of obtained products and making the utilization of the reagents more complete (in joint "operation" of the feature with the features "the gas outlets of the second dispersing dryer and of the second thermal hydrolysis reactor being communicated with the source of ammonium fluoride").

The features of the second claim describe a possible variant of structural embodiment of a source of ammonium fluoride; moreover, they make it possible to utilize excess water containing ammonia and to obtain additional products therefrom.

The features of the third claim make it possible to compensate for the loss of ammonia as it is gradually consumed (removed with water vapors).

The features of the fourth claim make it possible to rule out losses of the starting material suitable for producing red pigment.

The features of the fifth claim make it possible to "control" the quality of the obtained product.

As it will be apparent from the following description, the main object of the present invention is represented by a process for the production of titanium dioxide comprising the following steps:

(a) a titanium ore containing iron, preferably ilmenite, is reacted with an aqueous $NH_4F$ solution;

(b) the aqueous suspension thus obtained is filtered with consequent separation of a sludge fraction, which contains ammonium fluoroferrates, and a filtrate fraction, which contains ammonium fluorotitanates;

(c) the filtrate fraction thus obtained is subjected to an hydrolysis reaction;

(d) the thus-obtained solid component is subjected to a thermal hydrolysis reaction.

Step (a) is preferably performed at 100-120° C., at a pressure of about 1-2 bar and at a pH of about 6.5-7.0; the aqueous $NH_4F$ solution normally has a concentration of 30-60% by weight, preferably about 45%.

According to a preferred embodiment of the invention, the thermal hydrolysis reaction (c) is performed in two reactors; the first reactor is maintained at a temperature of up to 300-350° C. whereas the second reactor is maintained at a temperature of up to 800-900° C. The body of the first and/or second reactor is preferably made of a chromium-nickel alloy; the internal surface of the first reactor is preferably made of magnesium or a graphite-reinforced polymer or vitreous carbon whereas the internal surface of the second reactor is preferably made of silica.

The sludge fraction of step (b) may also be subjected to a thermal hydrolysis reaction which is preferably performed at a temperature of up to 300-350° C.

Figure 1:
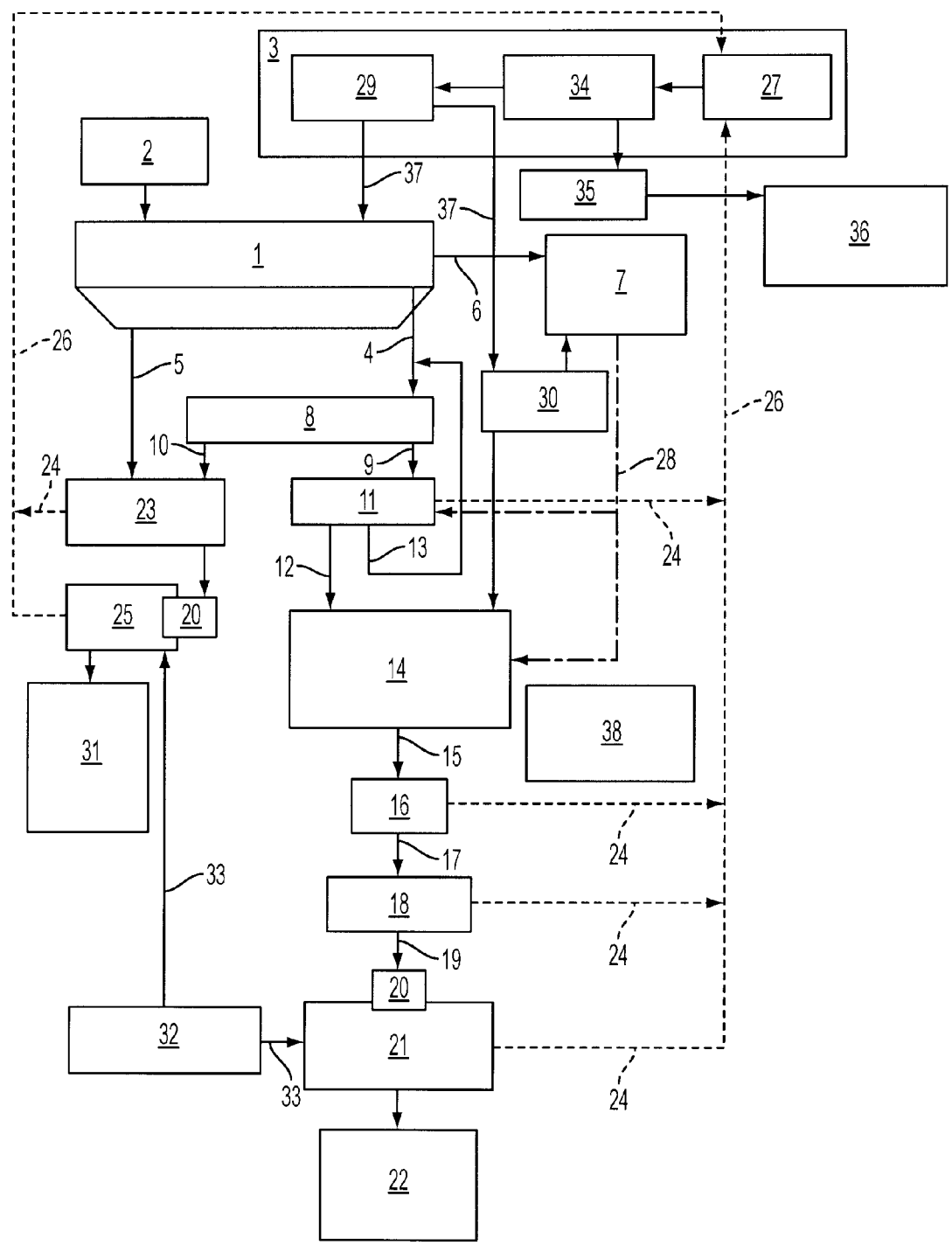
FIG. 1 shows a schematic diagram of the facility.
Figure 1B:
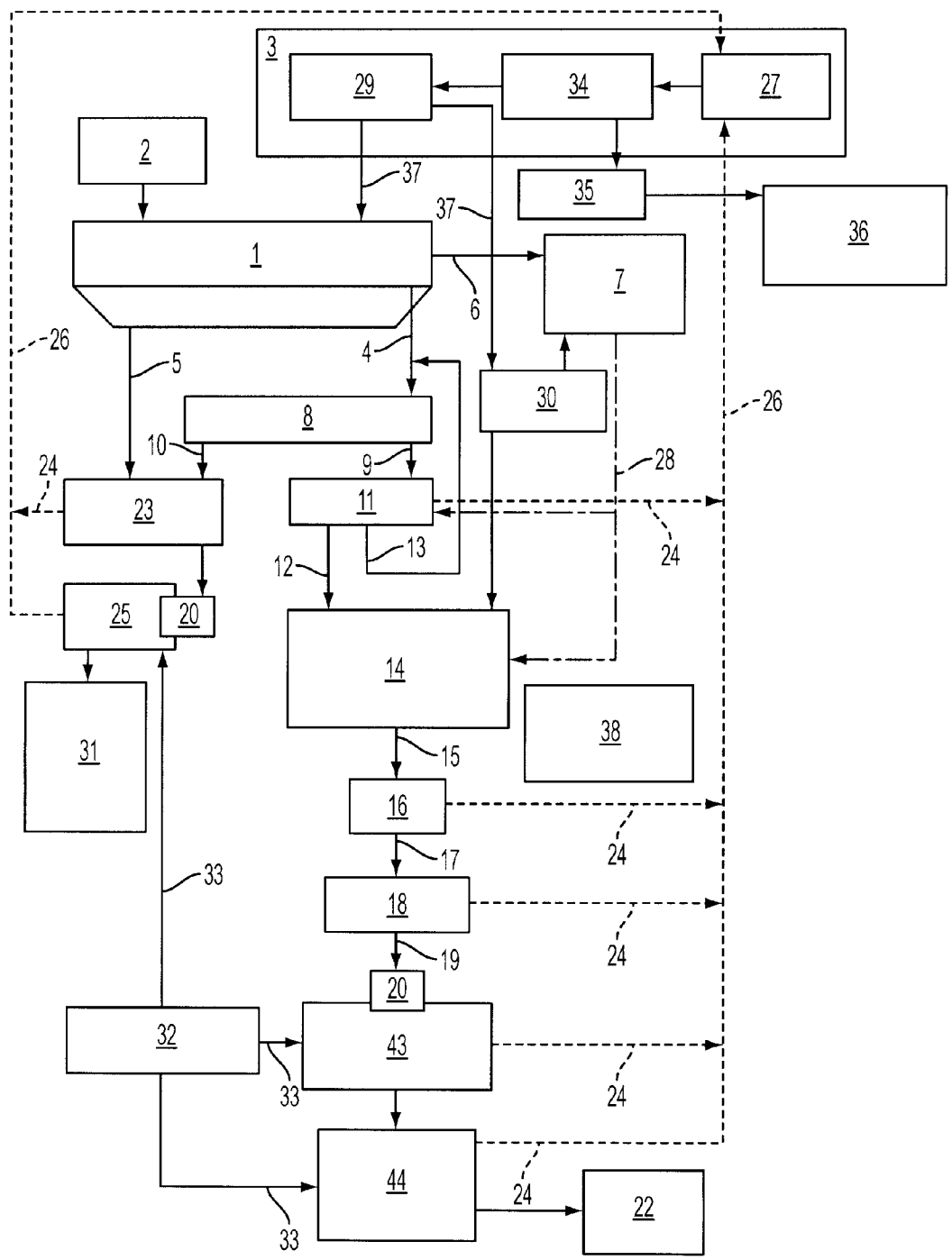
FIG. 1b is shows an alternative version of the facility wherein the first thermal hydrolysis reactor consists of two series-connected reactor blocks (43 and 44), which are also separately represented by FIGS. 3 and 4, respectively.
Figure 2:
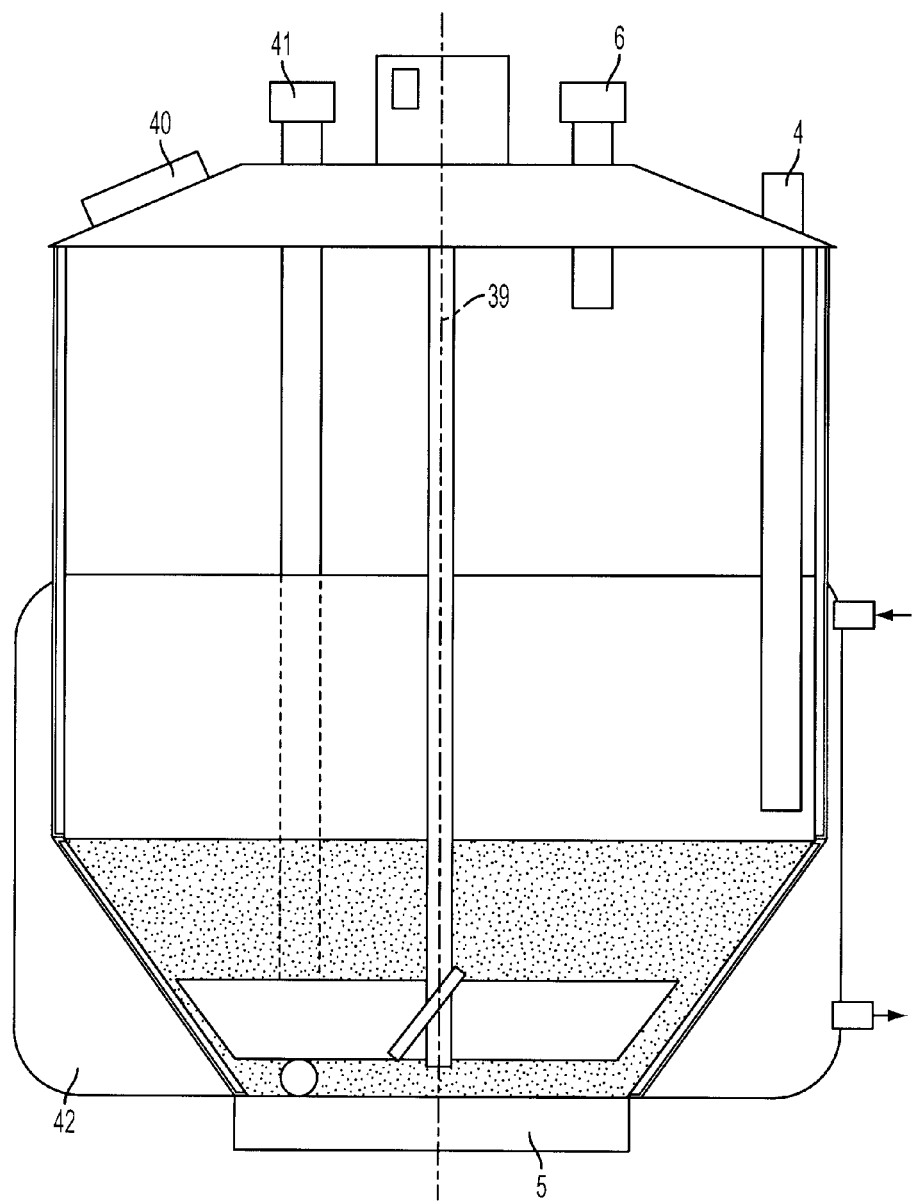
FIG. 2 is a sectional view of reactor 1.
Figure 3:
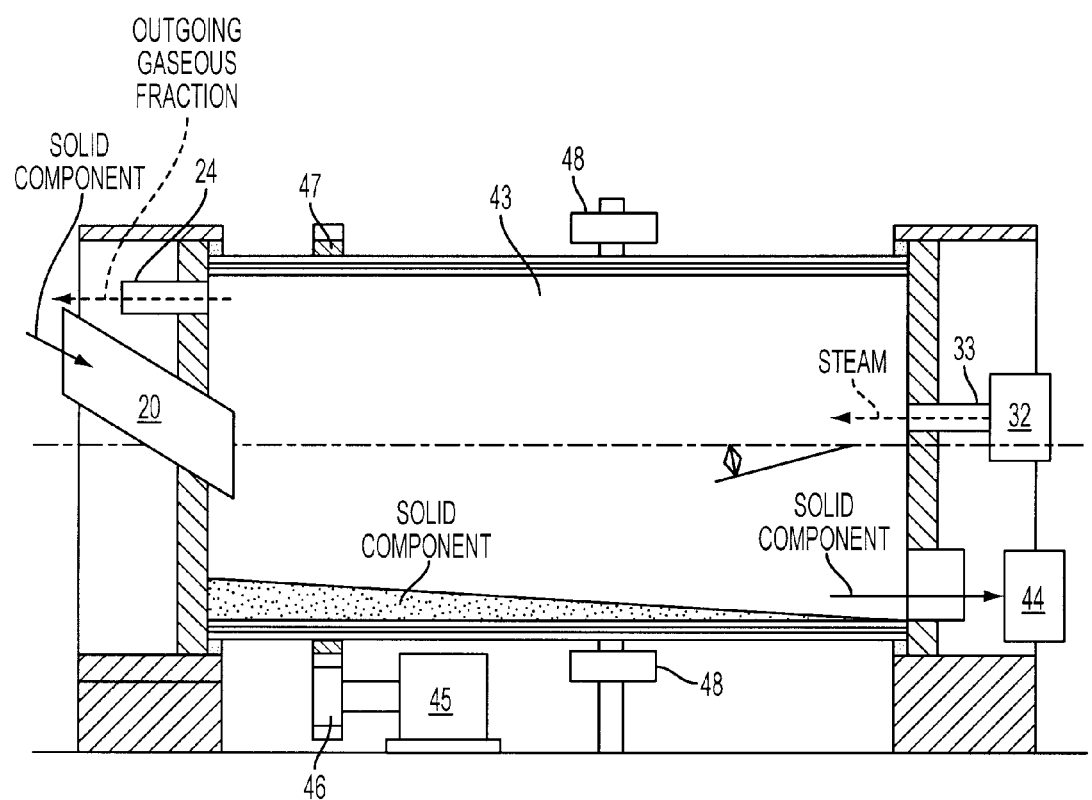
FIG. 3 is a sectional view of the first stage of the first thermal hydrolysis reactor.
Figure 4:
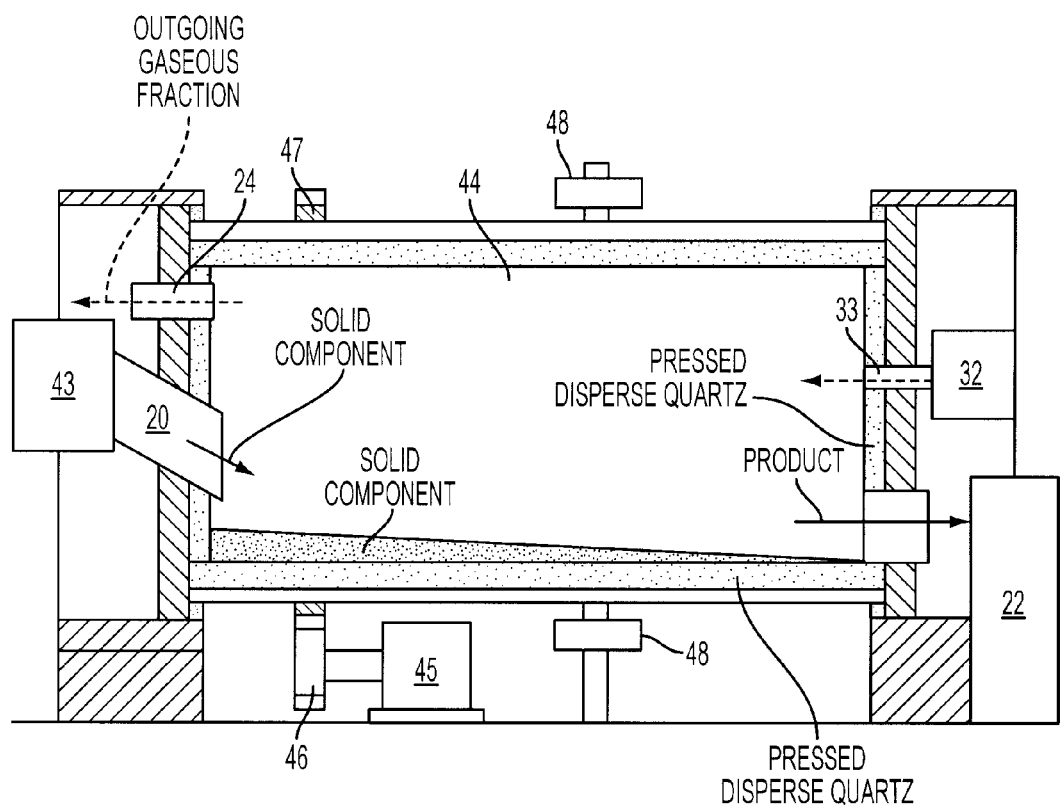
FIG. 4 is a sectional view of the second stage of the first thermal hydrolysis reactor.

A further object of the invention is represented by the plant for performing the above process, as for instance in the form represented by FIGS. 1 and 1b is; additional objects of the invention are also represented by the reactors for performing the reaction (a) and the thermal hydrolysis reaction (d), as for instance in the forms represented by FIGS. 2, 3 and 4.

Shown in the drawings are a reactor 1 communicated with a bin 2 and a source 3 of ammonium fluoride. Also shown in the drawings are filtrate outlet 4, sludge outlet 5 and gas outlet 6 of the reactor 1; a feeder of ammonia 7, a first filter 8 with a filtrate outlet 9 and a sludge outlet 10, a second filter 11 with a filtrate outlet 12 and a sludge outlet 13; a hydrolysis reactor 14 whose outlet 15 is communicated with a third filter 16 whose sludge outlet 17 is communicated with a first dispersing dryer 18 whose sludge outlet 19 is communicated with a loading unit 20 of a first thermal hydrolysis reactor 21 whose outlet is communicated with a container 22 far storing white pigment. The filtrate outlet 4 of the reactor 1 is communicated with the first filter 8, and its sludge outlet 5 is communicated with a second dispersing dryer 23. The gas outlet 6 of the reactor 1 is communicated with the feeder 7 of ammonia. The filtrate outlet 9 of the first filter is communicated with the second filter 11, and its sludge outlet 13 is communicated with a second dispersing dryer 23. The filtrate outlet 12 of the second filter is communicated with the hydrolysis reactor 14, and its sludge outlet 13 is communicated with the inlet of the first filter (with the filtrate outlet 4 of the reactor 1). Also shown in the drawings are gas outlets 24 of the second filter, of the first dispersing dryer, of the third filter, of the first thermal hydrolysis reactor 25, which by means of gas collecting mains 26 are communicated with a storage 27 of the source 3 of ammonium fluoride; besides, the feeder of ammonia 7 is shown, which by means of a gas main 28 is communicated with the second filter 11 and with the interior of the hydrolysis reactor 14; a feeder 29 of the source 3 of ammonium fluoride is communicated both with the interior of the hydrolysis reactor 14 and with the interior of the reactor 1, as well as with a heater 30; also shown is a container 31 for storing red pigment, which is communicated with the outlet of the second thermal hydrolysis reactor 25; besides, source of steam 32 is shown, which is communicated with the interior of the first thermal hydrolysis reactor and with the interior of the second thermal hydrolysis reactor via steam pipes 33. The source 3 of ammonium fluoride further comprises a storage 27 of ammonium fluoride, communicated with the feeder 29 of ammonium fluoride via an evaporator 34 whose steam outlet is communicated via a condenser 35 with a container 36 for storing ammonia water. The outlets of the feeder 29 of ammonium fluoride, made as pipelines 37, serve as the outlets of the source 3 of ammonium fluoride, while the inlets of the storage 27 of ammonium fluoride, made as collecting gas mains 26, serve as the inlets of the source of ammonium fluoride. Further, the feeder 29 of ammonium fluoride is communicated with the feeder 7 of ammonia via the heater 30. The interior of the hydrolysis reactor is further communicated with a source 38 of modifying agents. Since the claimed reactor facility is intended for realizing the fluoride technology of processing titaniferous stock materials: all the units thereof: the reactor, thermal hydrolysis reactors, hydrolysis reactors, filters, disintegrator dryers, pipelines and other members contacting aggressive fluorine-containing reagents and reaction materials are made of a material resistant to the effect of the reaction materials contacting them (within the working temperature ranges).

It is expedient to use a vertical (top-down) integration of the facility, wherein the apparatus providing the first technological steps are arranged above the apparatus providing subsequent technological steps. This will allow easy shifting of sludge-like reaction materials along the technological chain by gravity.

Reactor 1 employed in the facility of the invention (see FIG. 2) is a reactor having a conventional structural layout: comprising a stationary sealed cylindrical body having a vertical axis: in the interior of which a rotary shaft with stirrers 39 provided with a rotary speed governor is disposed. The reactor body has a cover through which branch pipes are passed: a loading branch pipe 40 (communicated with the bin 2) and a reagent branch pipe 41 (communicated with the source 3 of ammonium fluoride), as well as the filtrate outlet 4 and the gas outlet 6 of the reactor. The sludge outlet 5 of the reactor is located in the reactor bottom. The reactor is rated for temperatures of 100-120° C. The prescribed temperature regime is provided by a heat supply unit 42 made as a jacket (an additional shell) arranged on the lower portion of the body and bottom of the reactor and coupled to a source of heat carrier (not shown in the drawings). The reactor body is made of a structural material, namely, of a chemically stable chromium-nickel alloy Type 06ХН28МД T, and its internal surface contacting the reagents, as well as other parts and units disposed in the interior of the reactor body, are made of magnesium or a graphite-reinforced polymer or vitreous carbon, or are provided with a protective coating made of the above-said materials.

The first filter 8 and the second filter 11 do not differ in their design from conventional apparatus having a similar purpose (except for the material from which they are manufactured and tight sealing of the working space). Said filters differ from each other only in the working parameters of the filtering units (the second filter 11 provides a finer filtration and, the second filter is additionally coupled to the feeder 7 of ammonia and provided with the gas outlet 24).

The hydrolysis reactor 14 does not differ from conventional apparatus having a similar purpose (except for the material from which it is manufactured, tight sealing of the working space, and the number and purpose of the units for the inlet and outlet of the reaction materials and products).

The third filter 16 does not differ in its design from conventional apparatus having a similar purpose (except for the material from which it is manufactured, tight sealing of the working space; and the provision of the gas outlet 24) built around centrifuges, this being dictated by the consistence of the material fed to its inlet.

The first and second dispersing dryers 18 and 23 are similar in design (differing only in their throughput capacity) and do not differ from conventional apparatus having a similar purpose (except for the material from which they are manufactured, tight sealing of the working space, and provision of the gas outlets 24).

The loading units 20 of the first thermal hydrolysis reactor 21 and of the second thermal hydrolysis reactor 25 are made as tightly sealed reservoirs interconnected by tight inclined ducts providing gravity feed of loose materials into the thermal hydrolysis reactors (their purpose being to provide time-stabilized flow of the reaction material being loaded). The first thermal hydrolysis reactor 21 and the second thermal hydrolysis reactor 25 differ from the reactor 1 by the structural layout (their longitudinal axis being disposed at an angle of up to 10° to the horizontal) and by the cylindrical body rotating about this axis being mounted in stationary journals (constituting stationary end walls of the body). Because of difficulties with selecting a material for manufacturing the internal surfaces of the reactor, which must simultaneously have a high chemical resistance to fluoride containing materials and preserve strength at high working temperatures (up to 900° C.), it is most expedient to carry out the process thermal hydrolysis in two steps (the first step at temperatures lowered to 300-350° C. under conditions of maximum concentrations of the fluoride-containing components, followed by treating the material obtained in the first step (wherein the concentration of the fluoride-containing components is lowered by an order of magnitude and more) at a higher level of temperatures of up to 900° C.). For this purpose it is possible to use a stage of two series-connected reactor blocks 43 and 44 for thermal hydrolysis, having the same design (except for lining their interior). The body of the first of said blocks is made of a structural material, namely, of a chemically stable chromium-nickel alloy Type 06ХН28МД T, and its internal surface contacting the reagents, as well as other parts and units disposed in the interior of the reactor body, are made of magnesium or a graphite-reinforced polymer or vitreous carbon, or are provided with a protective coating made of the above-said materials. The body of the second of said blocks is made of a structural material, namely, of a chemically stable chromium-nickel alloy Type 06ХН28МД Т, and its internal surface contacting the reagents is made of silica (pressed disperse quartz). Each of the reactor blocks of the stages (of the first and second thermal hydrolysis reactors 21 and 25) is coupled via the steam pipe 33 to the source 32 of steam (made as a conventional generator of superheated steam). Each of said blocks is also coupled with the gas outlet 24 to the gas collecting main 26. Drives 45 for rotating the reactor bodies are made as electric motors with reducing gears whose output gears 46 are mounted with the possibility of interacting with a toothed rim 47 rigidly fixed on the cylindrical portion of the body of each of the reactor blocks. The stock material is loaded into the first reactor block 43, the finished product is unloaded from the second reactor block 44. The body of each of the reactor blocks being mobile, a heat supply unit 48 must provide non-contact heating. Therefore, in contradistinction to the reactor 1, it is expedient that the heat supply unit 48 should be of induction type (for instance, should comprise electromagnetic inductors mounted on annular frames encompassing the shell and ensuring non-contact high-frequency heating of the external shell of the reactors). The design of the second thermal hydrolysis reactor 25 is similar.

The source 38 of modifying agents is made as a bin, sealed off from the ambient medium and provided with a means for supplying modifying agents (a fine-dispersed mixture of salts of zinc, aluminum, zirconium, silicon) to the hydrolysis reactor 14 (made, e.g., as an inclined pipe providing gravity feed of loose material).

Containers 22 and 31 for storing the final product (white and red pigments) and the container 36 for storing ammonia water are similar in design (the difference being in the means for unloading the containers and also in the material: the surface of the container 22, which contacts the product, is made of a material which is either unoxidizable or gives colorless products of oxidation). The feeder 29 and the storage 27 of ammonium fluoride are made as tightly sealed containers for storing ammonium fluoride, provided with appropriate pumping means (not shown in the drawing). The feeder 7 of ammonia is made as a tightly closable container provided with conventional dispensing units, such as filling nozzles made of a material resistant to the effect of ammonia.

The evaporator 34, condenser 35 and heater 30 are made as heat exchange apparatus providing either heat supply to the liquids being pumped therethrough (the evaporator 34 and the heater 30) or removal of heat from the vapor-liquid flows being pumped therethrough (the condenser 35).

The detachable parts of the reactor bodies, thermal hydrolysis reactors, other apparatus comprised in the facility, and the contact surfaces of movable connections are made tight with the help of seals (not shown in the drawings) made of a sufficiently resilient, chemically stable material, preferably of a polymeric material based on carbon-reinforced plastics or polypropylene, if the latter withstands the working temperatures of the reactor.

Besides, the facility comprises a set of conventional instrumentation equipment (not shown in the drawings) for controlling the working conditions (temperature, volume of loading, acidity of the medium, and other working parameters).

The claimed facility operates in the following manner.

A batch of a titaniferous stock material, e.g. of ilmenite concentrate, whose basic component is ilmenite ($FeTiO_3$), is loaded into the interior of the reactor 1 from the bin 2 through the loading branch pipe 40, and an aqueous solution of ammonium fluoride (NH4F) (with a large excess of the latter) is introduced into the interior of the reactor 1 through the reagent branch pipe 41 from the feeder 29 of the source 3 of ammonium fluoride. The drive of the rotary shaft with stirrers 39 is switched on, providing continuous stirring of the reaction components, and the heat carrier is fed to the heat supply unit 42. The external surface of the reactor 1, contacting the heat carrier, becomes heated and gives off heat to the interior of the reactor, bringing the temperature therein to 90-110° C. Vapors of ammonia and water are vented through the gas outlet 6. After the expiry of time which is determined, for example, empirically with taking into account temperature parameters, concentrations of the reagents, etc., for concentrates differing in the content of useful component, or by taking samples from the reactor and carrying out their rapid analysis, the resulting liquid fraction containing a fine suspension of insoluble ammonium fluoroferrates in solution of ammonium fluorotitanates is removed from the reactor through the filtrate outlet 4).

Then a new batch of components is loaded into the reactor and the whole procedure is repeated. Since the process of stripping the titaniferous stock material is cyclic, it is expedient either to have several reactors in operation or to use intermediate storage containers whose volume allows ensuring time-constant volume of the stripped sock material supply.

Introducing aqueous ammonium fluoride solution under the loaded volume of the solid reaction component (ilmenite concentrate) will additionally promotes intermixing of the reagents by the bubbles of evolving ammonia.

The rotary speed of the shaft with stirrers 39 is adjusted so that the stirring of the reaction components should proceed without needless roiling of the forming liquid fraction (i.e., without transferring into suspended state the incompletely reacted solid particles of the solid component, having sufficiently large hydraulic size).

Since not only useful components but also ballast components are present in the composition of ilmenite concentrate, ballast components (sludge) accumulate in the course of the reactor operation. Periodically, after the removal of the formed liquid fraction; sludge is removed from the reactor interior, the sludge outlet 5 opened for this purpose.

Further the suspension of insoluble ammonium fluoroferrates in solution of ammonium ferrotitanates is fed to the first filter 8, wherein primary separation of the solution into a sludge fraction (containing ammonium fluoroferrates) and a filtrate fraction (containing ammonium fluorotitanates), and appropriate routing of said materials to the technological chain of producing red pigment or to the technological chain of producing white pigment, respectively, are carried out.

In the technological chain of obtaining white pigment, the filtrate fraction (containing ammonium fluorotitanates) comes to the second filter 11, wherein a the second (finer) degree of purification is carried out, feeding ammonia to the second filter (from the feeder 7 of ammonia) contributing to the coagulation and precipitation of iron salts. The sludge fraction is returned to the inlet of the first filter 8, and the filtrate fraction is fed to the hydrolysis reactor 14, wherein it is contacted with the aqueous solution of ammonium fluoride ($NH_4F$) and the modifying additives supplied, respectively, from the source 3 of ammonium fluoride, the feeder 7 of ammonia, and the source 38 of modifying agents. As a result, a sludge (paste-like mass) of ammonium oxofluorotitanate is obtained at the outlet 15 of the hydrolysis reactor 14. This material is dehydrated by passing the aqueous solution of ammonium fluoride through the third filter 16 and finally drying and comminuting it on the first dryer/disintegrator 18. Then, via the loading unit 20; the loose titanium oxofluorotitanate is passed through the reactor blocks 43 and 44 of the first thermal hydrolysis reactor, whereto superheated steam is supplied simultaneously, the temperature of up to 300-350° C. being maintained in the reactor block 43 and the temperature of up to 900° C. being maintained in the reactor block 44.

The material moves in the interior of the reactor blocks, because, as the bodies of the reactor blocks rotate, particles of the solid component roll over and slide down by gravity down the surface formed by the particles of the material in the interior of the reactor block. This surface has the form of an inclined plane whose upper end is located on the side toward which rotation is directed, and as soon as the particles reach the level of the original dip surface, they roll down. Since the longitudinal axis is inclined, the movement of the particles occurs not within the transverse plane of the shell, but has a vector directed from the inlet to the outlet. Therefore the superheated steam can all the time be in contact with the "self-intermixing" particles of the solid component. The operation of the heat supply unit 48 ensures the prescribed temperature regime of the reactor operation owing to the non-contact heating of the external surface of the reactor units and heat transfer to the internal surface of the reactor interior, and subsequent radiation of heat into the interior of the reactor block. The heat is thus transferred to the particles of the solid component, which are in contact with the interior of the reactor block, and the temperature in the reactor interior becomes brought to 300-350° C. $NH_4F$ and HF formed in the course of the reaction of ammonium oxofluorotitanate with superheated steam are vented together with water vapors through the gas outlet branch pipe 24. The solid component (containing $TiO_2$ and the remaining part of ammonium oxofluorotitanate (up to 10% of the initial amount) is transferred into the thermal hydrolysis reactor block 44. This block is rated for the temperature regime of up to 800-900° C. and operates similarly to the one just described above, but the initial product supplied thereinto is the material comprising $TiO_2$ and the remaining part of ammonium oxofluorotitanate (up to 10% of the initial amount). As the solid component moves along the lining made of pressed disperse quartz, its material enters into reaction with HF (evolving in the course of the reaction), giving silicon tetrafluoride (a volatile compound) which is removed together with waste gases through the gas outlet 24. The contact of the superheated steam fed to the reactor interior with the remained part of unreacted ammonium oxofluorotitanate at a temperature of up to 800-900° C. leads to its entering completely into the reaction. This provides obtaining at the outlet quality titanium oxide ($TiO_2$). This titanium oxide is unloaded into the container 22 for storing white pigment. During the operation of the facility, $NH_4F$ and HF formed in the second filter 11, in the first dispersing dryer 18, in the third filter 16. in the first thermal hydrolysis reactor 21, are discharged through their gas outlets 24 together with water vapors into the collecting gas mains 26 and further to the storage 27 of ammonium fluoride. For restoring the concentration of ammonium fluoride, the material thus collected is subjected to evaporation in the evaporator 34. The evaporating water vapors contain up to 2% of ammonia. After their condensation the resulting ammonia water is discharged into a container for storage thereof. The amount of ammonia in the feeder 7 of ammonia is replenished by discharging ammonia from the reactor 1 into feeder 7. If this proves to be not sufficient, then, owing to the operation of the heater 30, a corresponding portion of ammonium fluoride is subjected to decomposition (the appropriate portion of ammonium fluoride being withdrawn from the pipeline communicating the feeder 29 of ammonium fluoride and the hydrolysis reactor 14) to produce ammonia vapors which are also discharged into the feeder 7 of ammonia.

In the technological chain of producing red pigment, the sludge fraction (containing ammonium fluoroferrates) obtained at the sludge outlets 5 and 10 of the reactor 1 and the first filter 8: respectively, is dehydrated and dried (by venting ammonium fluoride together with water vapors), then this sludge fraction is comminuted on the second disintegrator dryer 23. After that loose ammonium fluoroferrate is loaded through the loading unit 20 into the second thermal hydrolysis reactor 25 and passed through the reactor blocks of thermal hydrolysis, whereto superheated steam is supplied simultaneously with similar regime parameters (the temperature of 300-350° C. being maintained in the first reactor block of thermal hydrolysis and the temperature of up to 900° C. being maintained in the second reactor block of thermal hydrolysis). The finished product (red pigment) is accumulated in the container 31.

The invention claimed is:

1. A process for the production of a white titanium dioxide pigment, the process comprising the steps of:
   (a) reacting a titanium ore containing iron with an aqueous $NH_4F$ solution at 100-120° C. and at a pressure of 1-2 bar to obtain an aqueous suspension;
   (b) filtering the aqueous suspension into a sludge fraction and a filtrate fraction, the filtrate fraction comprising ammonium oxofluorotitanate;
   (c) subjecting the filtrate fraction to a hydrolysis reaction to obtain an aqueous dispersion;
   (d) filtering the aqueous dispersion prior to a first thermal hydrolysis reaction to obtain a solid component comprising ammonium oxofluorotitanate;
   (e) subjecting the solid component to the first thermal hydrolysis reaction in a first reactor in the presence of steam to release a first quantity of HF and $NH_4F$ from the ammonium oxofluorotitanate, the first reactor being maintained at a temperature of up to 350° C.;
   (f) passing the solid component to a second reactor connected in series with the first reactor;
   (g) subjecting the solid component to a second thermal hydrolysis reaction in a second reactor in the presence of steam to release a second quantity of HF and $NH_4F$ from the ammonium oxofluorotitanate to obtain a white titanium dioxide pigment, the second reactor maintained at a temperature of up to 900° C.; wherein in steps (e) and (g) the HF and $NH_4F$ are vented from the respective reactor.

2. A process according to claim 1, wherein the sludge fraction of step (b) contains ammonium fluoroferrates.

3. A process according to claim 1, wherein step (a) is performed at a pH of about 6.5-7.0.

4. A process according to claim 1, wherein the aqueous $NH_4F$ solution has a concentration of 30-60% by weight.

5. A process according to claim 1, wherein the aqueous $NH_4F$ solution has a concentration of about 45% by weight.

6. A process according to claim 1, wherein the first reactor is maintained at a temperature of 300-350° C.

7. A process according to claim 1, wherein the second reactor is maintained at a temperature of 800-900° C.

8. A process according to claim 1, wherein the first and second reactor comprise respective bodies made of a chromium-nickel alloy.

9. A process according to claim 1, wherein an internal surface of the first reactor is made of magnesium or a graphite-reinforced polymer or vitreous carbon.

10. A process according to claim 1, wherein an internal surface of the second reactor is made of silica.

11. A process according to claim 1, wherein the sludge fraction of step (b) is subjected to a thermal hydrolysis reaction.

12. A process according to claim 11, wherein said thermal hydrolysis for the sludge fraction is performed at a temperature of 300-350° C.

13. A process according to claim 11, wherein the sludge fraction of step (b) is dehydrated and dried before being subjected to said thermal hydrolysis.

14. A process according to claim 1, wherein the titanium ore containing iron is ilmenite.

15. A process according to claim 1, wherein ammonia produced in step (a) is recycled to the hydrolysis reaction of step (c).

16. A process according to claim 1, wherein the first or second reactor comprises a body made of a chromium-nickel alloy.

17. A process according to claim 1, wherein the steam is superheated.

* * * * *